(12) United States Patent
Mercuri (10) Patent No.: US 7,794,521 B2
(45) Date of Patent: *Sep. 14, 2010

(54) PRODUCTION OF CHAIN AGGLOMERATIONS OF NANO-SCALE METAL PARTICLES

(75) Inventor: Robert A. Mercuri, Seven Hills, OH (US)

(73) Assignee: Directa Plus SRL, Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/462,713

(22) Filed: Aug. 6, 2006

(65) Prior Publication Data

US 2010/0186550 A1 Jul. 29, 2010

Related U.S. Application Data

(63) Continuation-in-part of application No. 11/200,952, filed on Aug. 10, 2005.

(51) Int. Cl.
  *B22F 1/00* (2006.01)
  *B22F 9/00* (2006.01)
  *C21B 15/04* (2006.01)
  *C22B 5/20* (2006.01)
  *C22C 1/04* (2006.01)

(52) U.S. Cl. ....................................... 75/362
(58) Field of Classification Search .......... 75/362, 75/413; 977/777
  See application file for complete search history.

(56) References Cited

U.S. PATENT DOCUMENTS

| | | | |
|---|---|---|---|
| 1,836,732 A | 12/1931 | Schlecht et al. | |
| 2,884,319 A * | 4/1959 | Fabian et al. | 420/459 |
| 2,900,245 A | 8/1959 | Beller | |
| 2,935,394 A | 5/1960 | Hiler | |
| 2,938,781 A | 5/1960 | Schmeckenbecher | |
| 3,068,089 A | 12/1962 | Antonsen et al. | |
| 3,075,494 A | 1/1963 | Toulmin | |
| 3,158,499 A | 11/1964 | Jenkin | |
| 3,441,408 A * | 4/1969 | Schladitz | 419/45 |
| 3,570,829 A * | 3/1971 | Schladitz | 266/186 |
| 3,900,646 A | 8/1975 | Clyde | |
| 3,955,962 A * | 5/1976 | Dawihl et al. | 75/347 |
| 5,064,464 A * | 11/1991 | Sawada et al. | 75/347 |
| 5,085,690 A * | 2/1992 | Ebenhoech et al. | 75/362 |
| 5,130,204 A * | 7/1992 | Jenkin | 428/605 |
| 5,145,716 A * | 9/1992 | Paserin et al. | 427/586 |

(Continued)

OTHER PUBLICATIONS

Carl C. Koch, editor; Nanostructured Materials: Procesing, Properties and Potential Applications; Noyes Publications, 2002 (see Ch. 1, pp. 7-8, Figure 9).*

(Continued)

*Primary Examiner*—Scott Kastler
*Assistant Examiner*—Vanessa Velasquez
(74) *Attorney, Agent, or Firm*—Waddey & Patterson, P.C.; James R. Cartiglia (57) ABSTRACT

A process and apparatus for producing chain agglomerations of nano-scale metal particles includes feeding at least one decomposable moiety selected from the group consisting of organometallic compounds, metal complexes, metal coordination compounds and mixtures thereof into a reactor vessel; exposing the decomposable moiety to a source of energy sufficient to decompose the moiety and produce nano-scale metal particles; and deposit or collection of chain agglomerations of nano-scale metal particles.

8 Claims, 3 Drawing Sheets

U.S. PATENT DOCUMENTS

| | | | | |
|---|---|---|---|---|
| 5,358,695 | A | 10/1994 | Helble et al. | 423/592 |
| 5,897,945 | A | 4/1999 | Lieber et al. | 428/323 |
| 6,716,525 | B1 | 4/2004 | Yadav et al. | 428/402 |
| 6,761,870 | B1 | 7/2004 | Smalley et al. | |
| 2003/0097903 | A1* | 5/2003 | Deegan et al. | 75/10.21 |
| 2004/0009118 | A1 | 1/2004 | Phillips et al. | |
| 2004/0120882 | A1 | 6/2004 | Kumar et al. | |
| 2004/0159186 | A1* | 8/2004 | Matsui | 75/362 |
| 2005/0166934 | A1 | 8/2005 | Deevi et al. | 131/334 |

OTHER PUBLICATIONS

G. H. Lee et al., Arrays of Ferromagnetic Iron and Cobalt Nanocluster Wires, J. Phys. Chem. B, vol. 106, No. 9, Mar. 7, 2002.*

Hugh O. Pierson, editor; Handbook of Chemical Vapor Deposition—Principles, Technology, and Applications, $2^{nd}$ edition, Noyes Publications, 1999 (see Ch. 5, Section 4).*

Huh et al., "A design of a nanometer size metal particle generator: Thermal decomposition of metal carbonyls," Review of Scientific Instruments, vol. 70, No. 11, Nov. 1999, pp. 4366-4369.*

Pierson, Hanbook of Chemical Vapor Deposition (CVD): Principles, Technology, and Applications, Second Edition, Noyes Publications, 1999. pp. 52-55. (6 total scanned pages).*

Pierson, Hugh O.; Handbook of Chemical Vapor Deposition (CVD): Principles, Technology, and Applications, Second edition; Noyes Publications, 1999. pp. 111-115 (7 pages total, including front matter).*

Pierson, Hugh O. Handbook of Chemical Vapor Deposition: Principles, Technology, and Applications, Second Edition, Noyes Publications, 1999, pp. 36-67, 111-115.*

Swihart, Mark T. "Vapor-phase synthesis of nanoparticles," Current Opinion in Colloid and Interface Science, 8, (2003), pp. 127-133.*

International Publication No. WO 2004/036674, Apr. 29, 2004, PCT/EP2003/006592.

Catalysis with Platinum Carbonyl Clusters, Current Science, vol. 78, No. 11, Jun. 10, 2000.

The Impact of Nanoscience on Hetrogeneous Catalysis, Science, vol. 299, p. 1688, Mar. 14, 2003.

Nanotechnology of Catalysis, Stuve, Frontiers in Nanotechnology, May 13, 2003.

Catalysis on Surfaces, Friend, Scientific American, Apr. 1993.

Kirk-Othmer Encyclopedia of Chemical Technology, 4th Ed., vol. 5, pp. 123-140 (Wiley Interscience 1993).

Synthetic Approaches to Metallic Nanomaterials, pp. 4-32 (Wiley-VCH 2005), Richards & Bonnemann.

Sun et al. (2000) "Monodisperse FePt Nanoparticles and Ferromagnetic FePt Nanocrystal Superlattices", *Science*, 287(5460): 1989-1992.

Carotenuto et al. (2003) "A universal method for the synthesis of metal and metal sulfide clusters embedded in polymer matrices", *J. of Materials Chem.*, 13(12): 2927-2930.

M.T. Swihart, "Vapor-phase synthesis of nanoparticles," Current Opinion in Colloid and Interface Science 8 (2003) p. 127-133.

* cited by examiner

Figure 6. SEM/SE micrograph of chain-agglomerated particles./ 250KX/D30-3 Pedestal with conductive tape.

*FIG. 6*

PRODUCTION OF CHAIN AGGLOMERATIONS OF NANO-SCALE METAL PARTICLES

RELATED APPLICATIONS

This application is a continuation-in-part of copending and commonly assigned U.S. patent application Ser. No. 11/200,952 entitled "Process For The Production Of Nano-Scale Metal Particles," filed on Aug. 10, 2005 in the name of Robert A. Mercuri, and copending and commonly assigned U.S. patent application Ser. No. 11/201,368 entitled "Production of Nano-Scale Metal Particles," filed on Aug. 10, 2005 in the name of Robert A. Mercuri, the disclosures of each of which are incorporated by reference herein.

TECHNICAL FIELD

The present invention relates to a process for the production of chain agglomerations of nano-scale metal particles, useful for catalysis and other applications. By the practice of the present invention, chain agglomerations of nano-scale metal particles can be produced, and collected with precision and flexibility. Thus, the invention provides a practical and cost-effective system for preparing chain agglomerations of nano-scale metal particles.

BACKGROUND OF THE INVENTION

Catalysts are becoming ubiquitous in modern chemical processing. Catalysts are used in the production of materials such as fuels, lubricants, refrigerants, polymers, drugs, etc., as well as playing a role in water and air pollution mediation processes. Indeed, catalysts have been ascribed as having a role in fully one third of the material gross national product of the United States, as discussed by Alexis T. Bell in "The Impact of Nanoscience on Heterogeneous Catalysis" (Science, Vol. 299, pg. 1688, 14 Mar. 2003).

Generally speaking, catalysts can be described as small particles deposited on high surface area solids. Traditionally, catalyst particles can range from the sub-micron up to tens of microns. One example described by Bell is the catalytic converter of automobiles, which consist of a honeycomb whose walls are coated with a thin coating of porous aluminum oxide (alumina). In the production of the internal components of catalytic converters, an aluminum oxide wash coat is impregnated with nanoparticles of a platinum group metal catalyst material. In fact, most industrial catalysts used today include platinum group metals especially platinum, rhodium and iridium or alkaline metals like cesium, at times in combination with other metals such as iron or nickel.

The size of these particles has been recognized as extremely significant in their catalytic function. Indeed it is also noted by Bell that the performance of a catalyst can be greatly affected by the particle size of the catalyst particles, since properties such as surface structure and the electronic properties of the particles can change as the size of the catalyst particles changes.

In his study on nanotechnology of catalysis presented at the Frontiers in Nanotechnology Conference on May 13, 2003, Eric M. Stuve of the Department of Chemical Engineering of the University of Washington, described how the general belief is that the advantage of use of nano-sized particles in catalysis is due to the fact that the available surface area of small particles is greater than that of larger particles, thus increasing effectiveness by providing more metal atoms at the surface to optimize catalysis using such nano-sized catalyst materials. However, Stuve points out that the advantages of the use of nano-sized catalyst particles may be more than simply due to the size effect. Rather, the use of nanoparticles can exhibit modified electronic structure and a different shape with actual facets being present in the nanoparticles, which provide for interactions which can facilitate catalysis. Indeed, Cynthia Friend, in "Catalysis On Surfaces" (Scientific American, April 1993, p. 74), posits catalyst shape, and, more specifically, the orientation of atoms on the surface of the catalyst particles, as important in catalysis. In addition, differing mass transport resistances may also improve catalyst function. Thus, the production of nano-sized metal particles for use as catalysts on a more flexible and commercially efficacious platform is being sought. Moreover, other applications for nano-scale particles are being sought, whether for the platinum group metals traditionally used for catalysis or other metal particles.

Conventionally, however, catalysts are prepared in two ways. One such process involves catalyst materials being deposited on the surface of carrier particles such as carbon blacks or other like materials, with the catalyst-loaded particles then themselves being loaded on the surface at which catalysis is desired. One example of this is in the fuel cell arena, where carbon black or other like particles loaded with platinum group metal catalysts are then themselves loaded at the membrane/electrode interface to catalyze the breakdown of molecular hydrogen into atomic hydrogen to utilize its component protons and electrons, with the resulting electrons passed through a circuit as the current generated by the fuel cell. One major drawback to the preparation of catalyst materials through loading on a carrier particle is in the amount of time the loading reactions take, which can be measured in hours in some cases.

To wit, in U.S. Pat. No. 6,716,525, Yadav and Pfaffenbach describe the dispersing of nano-scale powders on coarser carrier powders in order to provide catalyst materials. The carrier particles of Yadav and Pfaffenbach include oxides, carbides, nitrides, borides, chalcogenides, metals and alloys. The nanoparticles dispersed on the carriers can be any of many different materials according to Yadav and Pfaffenbach, including precious metals such as platinum group metals, rare earth metals, the so-called semi-metals, as well as non-metallic materials, and even clusters such as fullerenes, alloys and nanotubes.

Alternatively, the second common method for preparing catalyst materials involves directly loading catalyst metals such as platinum group metals on a support without the use of carrier particles which can interfere with the catalytic reaction. For example, many automotive catalytic converters, as discussed above, have catalyst particles directly loaded on the aluminum oxide honeycomb which forms the converter structure. The processes needed for direct deposition of catalytic metals on support structures, however, are generally operated at extremes of temperature and/or pressures. For instance one such process is chemical sputtering at temperatures in excess of 1,500° C. and under conditions of high vacuum. Thus, these processes are difficult and expensive to operate.

In an attempt to provide nano-scale catalyst particles, Bert and Bianchini, in International Patent Application Publication No. WO 2004/036674, suggest a process using a templating resin to produce nano-scale particles for fuel cell applications. Even if technically feasible, however, the Bert and Bianchini methods require high temperatures (on the order of 300° C. to 800° C.), and require several hours. Accordingly, these processes are of limited value.

Taking a different approach, Sumit Bhaduri, in "Catalysis With Platinum Carbonyl Clusters," Current Science, Vol. 78, No. 11, 10 Jun. 2000, asserts that platinum carbonyl clusters, by which is meant polynuclear metal carbonyl complexes with three or more metal atoms, have potential as redox catalysts, although the Bhaduri publication acknowledges that the behavior of such carbonyl clusters as redox catalysts is not understood in a comprehensive manner. Indeed, metal carbonyls have been recognized for use in catalysis in other applications.

Metal carbonyls have also been used as, for instance, antiknock compounds in unleaded gasolines. However, more significant uses of metal carbonyls are in the production and/or deposition of the metals present in the carbonyl, since metal carbonyls are generally viewed as easily decomposed and volatile resulting in deposition of the metal and carbon monoxide.

Generally speaking, carbonyls are transition metals combined with carbon monoxide and have the general formula $M_x(CO)_y$, where M is a metal in the zero oxidation state and where x and y are both integers. While many consider metal carbonyls to be coordination compounds, the nature of the metal to carbon bond leads some to classify them as organometallic compounds. In any event, the metal carbonyls have been used to prepare high purity metals, although not for the production of nano-scale metal particles. As noted, metal carbonyls have also been found useful for their catalytic properties such as for the synthesis of organic chemicals in gasoline antiknock formulations.

Accordingly, what is needed is a system and process for the production of nano-scale metal particles for use as, e.g., catalyst materials. The desired system can be used for the preparation of nano-scale particles loaded on a carrier particle but, significantly, can also be used for the deposit or collection of nano-scale particles directly on a surface without the requirement for extremes in temperature and/or pressures.

SUMMARY OF THE INVENTION

A system and process for the production of chain agglomerations of nano-scale metal particles is presented. By nano-scale particles is meant particles having an average diameter of no greater than about 1,000 nanometers (nm), e.g., no greater than about one micron. More preferably, the particles produced by the inventive system have an average diameter no greater than about 250 nm, most preferably no greater than about 20 nm.

Preferably, the particles produced by the invention are roughly spherical or isotropic, meaning they have an aspect ratio of about 1.4 or less, although particles having a higher aspect ratio can also be prepared and used as catalyst materials. The aspect ratio of a particle refers to the ratio of the largest dimension of the particle to the smallest dimension of the particle (thus, a perfect sphere has an aspect ratio of 1.0). The diameter of a particle for the purposes of this invention is taken to be the average of all of the diameters of the particle, even in those cases where the aspect ratio of the particle is greater than 1.4.

Chain agglomerations of nano-scale metal particles can be produced by the present invention, which comprise hundreds, or even thousands, of nano-scale metal particles organized in an elongate arrangement (as opposed to a spherical or cluster arrangement), and can appear to the naked eye as fibrous in nature. More particularly, each chain agglomeration of nano-scale metal particles has an aspect ratio, that is, ratio of major dimension (i.e., length) to minor dimension (i.e., width or diameter) of at least about 700:1, more advantageously at least about 900:1. As such, the surface area of the inventive nano-scale metal particle chain agglomerations makes the agglomerations uniquely effective in applications such as catalysis.

In the practice of the present invention, a decomposable metal-containing moiety is fed into a reactor vessel and sufficient energy to decompose the moiety applied, such that the moiety decomposes and nano-scale metal particles are deposited on a support or in a collector. The decomposable moiety used in the invention can be any decomposable metal-containing material, including an organometallic compound, a metal complex or a metal coordination compound, provided that the moiety can be decomposed to provide free metals under the conditions existing in the reactor vessel, such that the free metal can be deposited on a support or collected by a collector. One example of a suitable moiety for use in the invention is a metal carbonyl, such as nickel or iron carbonyls, or noble metal carbonyls.

The invention is advantageously practiced in an apparatus comprising a reactor vessel, at least one feeder for feeding or supplying the decomposable moiety into the reactor vessel, a support or collector which is operatively connected to the reactor vessel for deposit or collection of nano-scale metal particles produced on decomposition of the decomposable moiety, and a source of energy capable of decomposing the decomposable moiety. The source of energy should act on the decomposable moiety such that the moiety decomposes to provide nano-scale metal particles which are deposited on the support or collected by the collector.

The reactor vessel can be formed of any material which can withstand the conditions under which the decomposition of the moiety occurs. Generally, where the reactor vessel is a closed system, that is, where it is not an open ended vessel permitting reactants to flow into and out of the vessel, the vessel can be under subatmospheric pressure, by which is meant pressures as low as about 250 millimeters (mm). Indeed, the use of subatmospheric pressures, as low as about 1 mm of pressure, can accelerate decomposition of the decomposable moiety and provide smaller nano-scale particles. However, one advantage of the invention is the ability to produce nano-scale particles at generally atmospheric pressure, i.e., about 760 mm. Alternatively, there may be advantage in cycling the pressure, such as from sub-atmospheric to generally atmospheric or above, to encourage nano-deposits within the structure of the particles or supports. Of course, even in a so-called "closed system," there needs to be a valve or like system for relieving pressure build-up caused, for instance, by the generation of carbon monoxide (CO) or other by-products. Accordingly, the use of the expression "closed system" is meant to distinguish the system from a flow-through type of system as discussed hereinbelow.

When the reactor vessel is a "flow-through" reactor vessel, that is, a conduit through which the reactants flow while reacting, the flow of the reactants can be facilitated by drawing a partial vacuum on the conduit, although no lower than about 250 mm is necessary in order to draw the reactants through the conduit towards the vacuum apparatus, or a flow of an inert gas such as nitrogen or argon can be pumped through the conduit to thus carry the reactants along the flow of the inert gas.

Indeed, the flow-through reactor vessel can be a fluidized bed reactor, where the reactants are borne through the reactor on a stream of a fluid. This type of reactor vessel may be especially useful where the nano-scale metal particles produced are intended to be loaded on support materials, like carbon blacks or the like, or where the metal particles are to be loaded on an ion exchange or similar resinous material.

The at least one feeder supplying the decomposable moiety into the reactor vessel can be any feeder sufficient for the purpose, such as an injector which carries the decomposable moiety along with a jet of a gas such as an inert gas like argon or nitrogen, to thereby carry the decomposable moiety along the jet of gas through the injector nozzle and into the reactor vessel. The gas employed can be a reactant, like oxygen or ozone, rather than an inert gas. This type of feeder can be used whether the reactor vessel is a closed system or a flow-through reactor.

Supports useful in the practice of the invention can be any material on which the nano-scale metal particles produced from decomposition of the decomposable moieties can be deposited. In a preferred embodiment, the support is the material on which the catalyst metal is ultimately destined, such as the aluminum oxide honeycomb of a catalytic converter in order to deposit nano-scale particles on catalytic converter components without the need for extremes of temperature and pressure required by sputtering and like techniques. Alternatively, a collector capable of collecting nano-scale metal particles, such as a cyclonic or centrifugal collector, is employed.

The support or collector can be disposed within the reactor vessel (indeed this is required in a closed system and is practical in a flow-through reactor). However, in a flow-through reactor vessel, the flow of reactants can be directed at a support positioned outside the vessel, at its terminus, especially where the flow through the flow-through reactor vessel is created by a flow of an inert gas. Alternatively, in a flow-through reactor, the flow of nano-scale metal particles produced by decomposition of the decomposable moiety can be directed into a centrifugal or cyclonic collector which collects the nano-scale particles in a suitable container for future use.

The energy employed to decompose the decomposable moiety can be any form of energy capable of accomplishing this function. For instance, electromagnetic energy such as infrared, visible, or ultraviolet light of the appropriate wavelengths can be employed. Additionally, microwave and/or radio wave energy, or other forms of sonic energy can also be employed (example, a spark to initiate "explosive" decomposition assuming suitable moiety and pressure), provided the decomposable moiety is decomposed by the energy employed. Thus, microwave energy, at a frequency of about 2.4 gigahertz (GHz) or induction energy, at a frequency which can range from as low as about 180 hertz (Hz) up to as high as about 13 mega Hz can be employed. A skilled artisan would readily be able to determine the form of energy useful for decomposing the different types of decomposable moieties which can be employed.

One preferred form of energy which can be employed to decompose the decomposable moiety is heat energy supplied by, e.g., heat lamps, radiant heat sources, or the like. Such heat can be especially useful for highly volatile moieties, such as metal carbonyls in transparent vessels. In such case, the temperatures needed are no greater than about 500° C., and generally no greater than about 250° C. Indeed, generally, temperatures no greater than about 200° C. are needed to decompose the decomposable moiety and produce nano-scale metal particles therefrom.

Depending on the source of energy employed, the reactor vessel should be designed so as to not cause deposit of the nano-scale metal particles on the vessel itself (as opposed to the collector) as a result of the application of the source of energy. In other words, if the source of energy employed is heat, and the reactor vessel itself becomes heated to a temperature at or somewhat higher than the decomposition temperature of the decomposable moiety during the process of applying heat to the decomposable moiety to effect decomposition, then the decomposable moiety will decompose at the walls of the reactor vessel, thus coating the reactor vessel walls with nano-scale metal particles rather than collecting the nano-scale metal particles with the collector (one exception to this general rule occurs if the walls of the vessel are so hot that the decomposable moiety decomposes within the reactor vessel and not on the vessel walls, as discussed in more detail below).

One way to avoid this is to direct the energy directly at the collector. For instance, if heat is the energy applied for decomposition of the decomposable moiety, the support or collector can be equipped with a source of heat itself, such as a resistance heater in or at a surface of the support or collector such that the support or collector is at the temperature needed for decomposition of the decomposable moiety and the reactor vessel itself is not. Thus, decomposition occurs at the support or collector and formation of nano-scale particles occurs principally at the support or collector. When the source of energy employed is other than heat, the source of energy can be chosen such that the energy couples with the support or collector, such as when microwave or induction energy is employed. In this instance, the reactor vessel should be formed of a material which is relatively transparent to the source of energy, especially as compared to the support or collector.

For the production of the inventive chain agglomerations, the source of heat is advantageously a resistance heater, such as a wire, disposed within the flow of decomposable moieties. The heated wire provides a point of contact for the decomposition of decomposable moieties to form nano-scale metal particles; additional decomposition then occurs on the previously formed particles, and continues as chains of nano-scale metal particles are formed from these initial particles produced on the wire. While the precise mechanism for this phenomenon is not fully understood, it is believed that decomposition of decomposable moieties to produce nano-scale metal particles occurs by conduction along the chain as it forms. In other words, nano-scale metal particles are formed on the wire, which then cause further decomposition of decomposable moieties thereon by heat conduction along the metal particles formed on the wire, and so on.

Especially in situations when the support or collector is disposed outside the reactor vessel when a flow-through reactor vessel is employed with a support or collector at its terminus (whether a solid substrate collector for depositing of nano-scale metal particles thereon or a cyclonic or like collector for collecting the nano-scale metal particles for a suitable container), the decomposition of the decomposable moiety occurs as the moiety is flowing through the flow-through reactor vessel and the reactor vessel should be transparent to the energy employed to decompose the decomposable moiety. Alternatively, whether or not the support or collector is inside the reactor vessel, or outside it, the reactor vessel can be maintained at a temperature below the temperature of decomposition of the decomposable moiety, where heat is the energy employed. One way in which the reactor vessel can be maintained below the decomposition temperatures of the moiety is through the use of a cooling medium like cooling coils or a cooling jacket. A cooling medium can maintain the walls of the reactor vessel below the decomposition temperatures of the decomposable moiety, yet permit heat to pass within the reactor vessel to heat the decomposable moiety and cause decomposition of the moiety and production of nano-scale metal particles.

In an alternative embodiment which is especially applicable where both the walls of the reactor vessel and the gases in the reactor vessel are generally equally susceptible to the heat energy applied (such as when both are relatively transparent), heating the walls of the reactor vessel, when the reactor vessel is a flow-through reactor vessel, to a temperature substantially higher than the decomposition temperature of the decomposable moiety can permit the reactor vessel walls to themselves act as the source of heat. In other words, the heat radiating from the reactor walls will heat the inner spaces of the reactor vessel to temperatures at least as high as the decomposition temperature of the decomposable moiety. Thus, the moiety decomposes before impacting the vessel walls, forming nano-scale particles which are then carried along with the gas flow within the reactor vessel, especially where the gas velocity is enhanced by a vacuum. This method of generating decomposition heat within the reactor vessel is also useful where the nano-scale particles formed from decomposition of the decomposable moiety are being attached to carrier materials (like carbon black) also being carried along with the flow within the reactor vessel. In order to heat the walls of the reactor vessel to a temperature sufficient to generate decomposition temperatures for the decomposable moiety within the reactor vessel, the walls of the reactor vessel are preferably heated to a temperature which is significantly higher than the temperature desired for decomposition of the decomposable moiety(ies) being fed into the reactor vessel, which can be the decomposition temperature of the decomposable moiety having the highest decomposition temperature of those being fed into the reactor vessel, or a temperature selected to achieve a desired decomposition rate for the moieties present. For instance, if the decomposable moiety having the highest decomposition temperature of those being fed into the reactor vessel is nickel carbonyl, having a decomposition temperature of about 50° C., then the walls of the reactor vessel should preferably be heated to a temperature such that the moiety would be heated to its decomposition temperature several (at least three) millimeters from the walls of the reactor vessel. The specific temperature is selected based on internal pressure, composition and type of moiety, but generally is not greater than about 250° C. and is typically less than about 200° C. to ensure that the internal spaces of the reactor vessel are heated to at least 50° C.

In any event, the reactor vessel, as well as the feeders, can be formed of any material which meets the requirements of temperature and pressure discussed above. Such materials include a metal, graphite, high density plastics or the like. Most preferably the reactor vessel and related components are formed of a transparent material, such as quartz or other forms of glass, including high temperature glass commercially available as Pyrex® materials.

Thus, in the process of the present invention, decomposable metal-containing moieties are fed into a reactor vessel where they are exposed to a source of energy sufficient to decompose the moieties and produce nano-scale metal particles, especially chain agglomerations of nano-scale metal particles. The decomposable moieties are fed into a closed-system reactor under vacuum or in the presence of an inert gas; similarly, the moieties are fed into a flow-through reactor where the flow is created by drawing a vacuum or flowing an inert gas through the flow-through reactor. The energy applied is sufficient to decompose the decomposable moiety in the reactor or as it as flowing through the reactor, and free the metal from the moiety and thus create nano-scale metal particles which are deposited on a support or collected in a collector. Where heat is the energy used to decompose the decomposable moiety, temperatures no greater than about 500° C., more preferably no greater than about 250° C., and most preferably no greater than about 200° C., are required to produce nano-scale metal particles, which can then be directly deposited on the substrate for which they are ultimately intended without the use of carrier particles and in a process requiring only minutes and not under extreme conditions of temperature and pressure. Indeed, the process of the present invention often requires less than about one minute to produce nano-scale particles and, in some embodiments, can require less than about 5 seconds.

In one embodiment of the inventive process, a single feeder feeds a single decomposable moiety into the reactor vessel for formation of nano-scale metal particles. In another embodiment, however, a plurality of feeders each feeds decomposable moieties into the reactor vessel. In this way, all feeders can feed the same decomposable moiety or different feeders can feed different decomposable moieties, such as additional metal carbonyls, so as to provide nano-scale particles containing different metals such as platinum-nickel combinations or nickel-iron combinations as desired, in proportions determined by the amount of the decomposable moiety fed into the reactor vessel. For instance, by feeding different decomposable moieties through different feeders, one can produce a nano-scale particle having a core of a first metal, with domains of a second or third, etc. metal coated thereon. Indeed, altering the decomposable moiety fed into the reactor vessel by each feeder can alter the nature and/or constitution of the nano-scale particles produced. In other words, if different proportions of metals making up the nano-scale particles, or different orientations of the metals making up the nano-scale particles is desired, altering the decomposable moiety fed into the reactor vessel by each feeder can produce such different proportions or different orientations.

Indeed, in the case of the flow-through reactor vessel, each of the feeders can be arrayed about the circumference of the conduit forming the reactor vessel at approximately the same location, or the feeders can be arrayed along the length of the conduit so as to feed decomposable moieties into the reactor vessel at different locations along the flow path of the conduit to provide further control of the nano-scale particles produced.

While it is anticipated that the inventive process and apparatus may also produce particles that are larger than nano-scale in size along with the nano-scale particles desired, the larger particles can be separated from the sought-after nano-scale particles through the use of the cyclonic separator or because of their differing deposition rates on a collector.

Therefore it is an object of the present invention to provide a process and apparatus for the production of nano-scale metal particles.

It is another object of the present invention to provide a process and apparatus capable of producing nano-scale metal particles under conditions of temperature and/or pressure less extreme than conventional processes.

It is still another object of the present invention to provide a process for preparing nano-scale metal particles which can be directly deposited on the end use substrate.

It is yet another object of the present invention to provide a process for preparing nano-scale metal particles which can be collected for further use or treatment.

It is a further object of the present invention to provide chain agglomerations of nano-scale metal particles.

These objects and others which will be apparent to the skilled artisan upon reading the following description, can be achieved by providing a process and apparatus for producing nano-scale metal particles, including providing a reactor vessel; feeding at least one decomposable moiety selected from the group of organometallic compounds, metal complexes, metal coordination compounds, and mixtures thereof into a reactor vessel; exposing the decomposable moiety within the reactor vessel to a source of energy sufficient to decompose the moiety and produce nano-scale metal particles; and deposit or collection of the nano-scale metal particles. Preferably, the temperature within the reactor vessel is no greater than about 250° C. The pressure within the reactor vessel is preferably generally atmospheric, but pressures which vary between about 1 mm to about 2000 mm can be employed.

The reactor vessel is advantageously formed of a material which is relatively transparent to the energy supplied by the source of energy, as compared to either the collector on which the nano-scale metal particles are collected or the decomposable moieties, such as where the source of energy is radiant heat. In fact, the support or collector can have incorporated therein a resistance heater, or the source of energy can be a heat lamp. Where the source of energy is radiant heat, the reactor vessel can be cooled, such as by a cooling medium like cooling coils or a cooling jacket disposed about the reactor vessel to preclude decomposition of the moiety and deposit of particles at the vessel walls.

The support can be the end use substrate for the nano-scale metal particles produced, such as a component of an automotive catalytic converter or a fuel cell or electrolysis membrane or electrode. The support or collector can be positioned within the reactor vessel. However, the reactor vessel can be a flow-through reactor vessel comprising a conduit, and in such case the support or collector can be disposed either external to the reactor vessel or within the reactor vessel.

It is to be understood that both the foregoing general description and the following detailed description present embodiments of the invention, and are intended to provide an overview or framework for understanding the nature and character of the invention as it is claimed.

The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
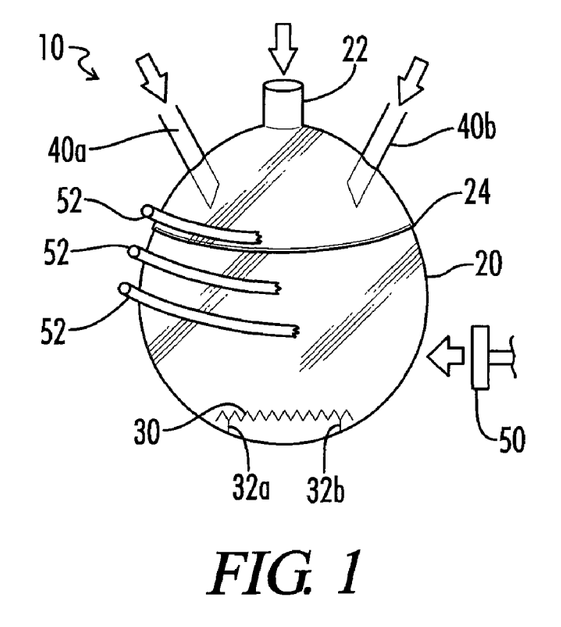
FIG. 1 is a side plan view of an apparatus for the production of nano-scale metal particles utilizing a "closed system" reactor vessel in accordance with the present invention.
Figure 2:
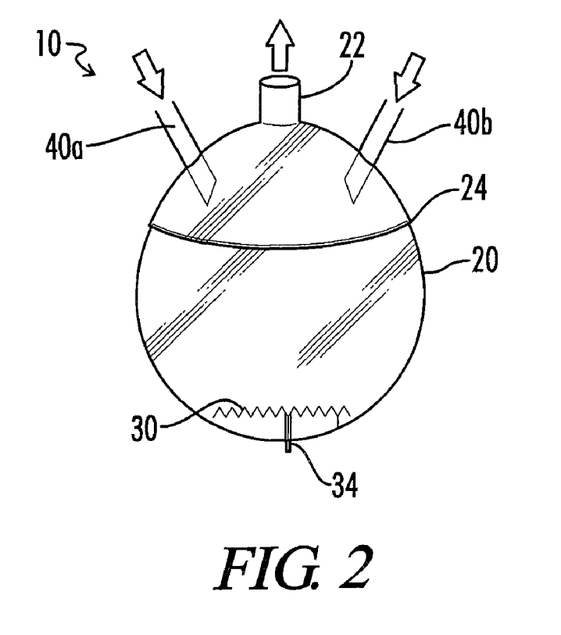
FIG. 2 is a side plan view of an alternate embodiment of the apparatus of FIG. 1.

Referring now to the drawings, an apparatus in which the inventive process for the production of nano-scale metal particles can be practiced is generally designated by the numeral 10 or 100. In FIGS. 1 and 2 apparatus 10 is a closed system comprising closed reactor vessel 20 whereas in FIGS. 3-5 apparatus 100 is a flow-through reaction apparatus comprising flow-through reactor vessel 120.

It will be noted that FIGS. 1-5 show apparatus 10, 100 in a certain orientation. However, it will be recognized that other orientations are equally applicable for apparatus 10, 100. For instance, when under vacuum, reactor vessel 20 can be in any orientation for effectiveness. Likewise, in flow-through reactor vessel 120, the flow of inert carrier gas and decomposable moieties or the flow of decomposable moieties as drawn by a vacuum in FIGS. 3-5 can be in any particular direction or orientation and still be effective. In addition, the terms "up" "down" "right" and "left" as used herein refer to the orientation of apparatus 10, 100 shown in FIGS. 1-5.

Referring now to FIGS. 1 and 2, as discussed above apparatus 10 comprises a closed-system reactor vessel 20 formed of any material suitable for the purpose and capable of withstanding the exigent conditions for the reaction to proceed inside including conditions of temperature and/or pressure. Reactor vessel 20 includes an access port 22 for providing an inert gas such as argon to fill the internal spaces of reactor vessel 20, the inert gas being provided by a conventional pump or the like (not shown). Similarly, as illustrated in FIG. 2, port 22 can be used to provide a vacuum in the internal spaces of reactor vessel 20 by using a vacuum pump or similar device (not shown). In order for the reaction to successfully proceed under vacuum in reactor vessel 20, it is not necessary that an extreme vacuum condition be created. Rather negative pressures no less than about 1 mm, preferably no less than about 250 mm, are all that are required.

Reactor vessel 20 has disposed therein a support 30 which can be attached directly to reactor vessel 20 or can be positioned on legs 32a and 32b within reactor vessel 20. Reactor vessel 20 also comprises a sealable opening shown at 24, in order to permit reactor vessel 20 to be opened after the reaction is completed to remove support 30 or remove nano-scale metal particles deposited on support 30. Closure 24 can be a threaded closure or a pressure closure or other types of closing systems, provided they are sufficiently air tight to maintain inert gas or the desired level of vacuum within reactor vessel 20.

Apparatus 10 further comprises at least one feeder 40, and preferably a plurality of feeders 40a and 40b, for feeding reactants, more specifically the decomposable moiety, into reactor vessel 20. As illustrated in FIGS. 1 and 2, two feeders 40a and 40b are provided, although it is anticipated that other feeders can be employed depending on the nature of the decomposable moiety/moieties introduced into vessel 20 and/or end product nano-scale metal particles desired. Feeders 40a and 40b can be fed by suitable pumping apparatus for the decomposable moiety such as venturi pumps or the like (not shown).

As illustrated in FIG. 1, apparatus 10 further comprises a source of energy capable of causing decomposition of the decomposable moiety. In the embodiment illustrated in FIG. 1, the source of energy comprises a source of heat, such as a heat lamp 50, although other radiant heat sources can also be employed. In addition, as discussed above, the source of energy can be a source of electromagnetic energy, such as infrared, visible or ultraviolet light, microwave energy, radio waves or other forms of sonic energy, as would be familiar to the skilled artisan, provided the energy employed is capable of causing decomposition of the decomposable moiety.

In one embodiment, the source of energy can provide energy that is preferentially couple-able to support 30 so as to facilitate deposit of nano-scale metal particles produced by decomposition of the decomposable moiety on support 30.

However, where a source of energy such as heat is employed, which would also heat reactor vessel 20, it may be desirable to cool reactor vessel 20 using, e.g., cooling tubes 52 (shown partially broken away) such that reactor vessel 20 is maintained at a temperature below the decomposition temperature of the decomposable moiety. In this way, the decomposable moiety does not decompose at the surfaces of reactor vessel 20 but rather on support 30.

In an alternative embodiment illustrated in FIG. 2, support 30 itself comprises the source of energy for decomposition of the decomposable moiety. For instance, a resistance heater powered by connection 34 can be incorporated into or comprise support 30 such that only support 30 is at the temperature of decomposition of the decomposable moiety, such that the decomposable moiety decomposes on support 30 and thus produces nano-scale metal particles deposited on support 30, such as the chain agglomeration of nano-scale metal particles shown in FIG. 6. Likewise, other forms of energy for decomposition of the decomposable moiety can be incorporated into support 30.

Support 30 can be formed of any material sufficient to have deposit thereon of nano-scale metal particles produced by decomposition of the decomposable moiety. In a preferred embodiment, support 30 comprises the end use substrate on which the nano-scale metal particles are intended to be employed, such as the aluminum oxide or other components of an automotive catalytic converter, or the electrode or membrane of a fuel cell or electrolysis cell. Indeed, where the source of energy is itself embedded in or associated with support 30, selective deposition of the catalytic nano-scale metal particles can be obtained to increase the efficiency of the catalytic reaction and reduce inefficiencies or wasted catalytic metal placement. In other words, the source of energy can be embedded within support 30 in the desired pattern for deposition of catalyst metal, such that deposition of the catalyst nano-scale metal can be placed where catalytic reaction is desired.

Figure 3:
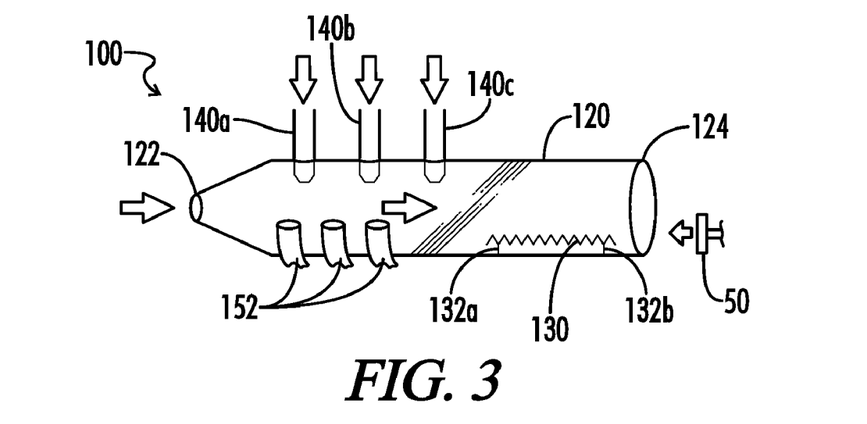
FIG. 3 is a side plan view of an apparatus for the production of nano-scale metal particles utilizing a "flow-through" reactor vessel in accordance with the present invention.
Figure 4:
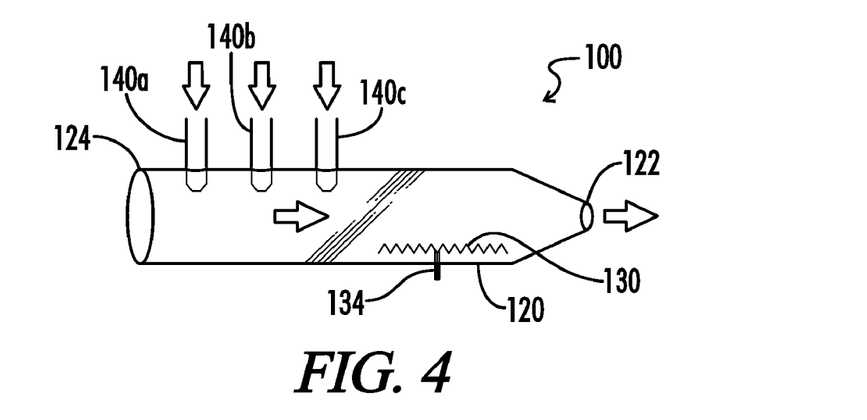
FIG. 4 is an alternative embodiment of the apparatus of FIG. 3.
Figure 5:
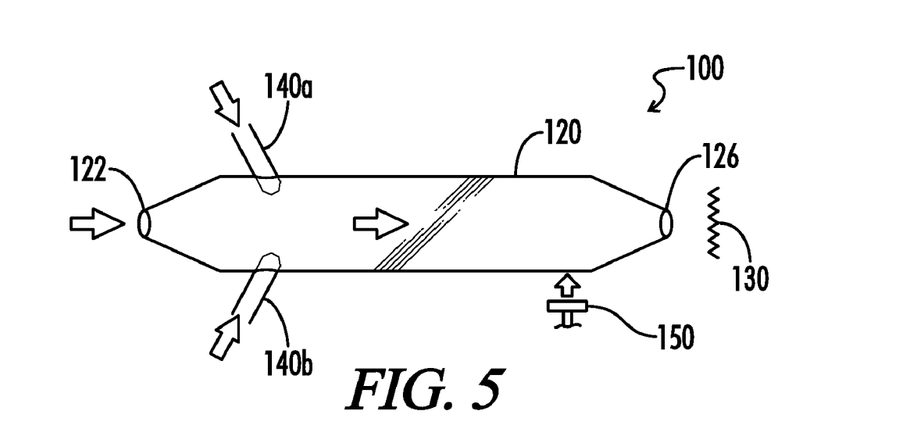
FIG. 5 is another alternative embodiment of the apparatus of FIG. 3, using a support external to the flow-through reactor vessel.

In another embodiment of the invention, as illustrated in FIGS. 3-5, apparatus 100 comprises a flow-through reactor vessel 120 which includes a port, denoted 122, for either providing an inert gas or drawing a vacuum from reactor vessel 120 to thus create flow for the decomposable moieties to be reacted to produce nano-scale metal particles. In addition, apparatus 100 includes feeders 140a, 140b, 140c, which can be disposed about the circumference of reactor vessel 120, as shown in FIG. 3, or, in the alternative, sequentially along the length of reactor vessel 120, as shown in FIG. 4.

Apparatus 100 also comprises support 130 on which nano-scale metal particles are collected. Support 130 can be positioned on legs 132a and 132b or, in the event a source of energy is incorporated into support 130, as a resistance heater, the control and wiring for the source of energy in support 130 can be provided through line 134.

As illustrated in FIGS. 3 and 4, when support 130 is disposed within flow-through reactor vessel 120, a port 124 is also provided for removal of support 130 or the nano-scale metal particles deposited thereon. In addition, port 124 should be structured such that it permits the inert gas fed through port 122 and flowing through reactor vessel 120 to egress reactor vessel 120 (as shown in FIG. 3). Port 124 can be sealed in the same manner as closure 24 discussed above with respect to closed system apparatus 10. In other words, port 124 can be sealed by a threaded closure or pressure closure or other types of closing structures as would be familiar to the skilled artisan.

As illustrated in FIG. 5, however, support 130 can be disposed external to reactor vessel 120 in flow-through reactor apparatus 100. While support 130 can be a cyclonic or centrifugal collector (not shown), it can also be a structural support 130 as illustrated in FIG. 5. In this embodiment, flow-through reactor vessel 120 comprises a port 124 through which decomposable moieties are impinged on support 130 to thus deposit the nano-scale metal particles on support 130. In this way it is no longer necessary to gain access to reactor vessel 120 to collect either support 130 or the nano-scale metal particles deposited thereon. In addition, during the impingement of the decomposable moieties to produce nano-scale metal particles on support 130, either port 126 or support 130 can be moved in order to provide for an impingement of the produced nano-scale metal particles on certain specific areas of support 130. This is especially useful if support 130 comprises the end use substrate for the nano-scale metal particles such as the component of a catalytic converter or electrode for fuel cells. Thus, the nano-scale metal particles are only produced and deposited where desired and efficiency and decrease of wasted catalytic metal is facilitated.

As discussed above, reactor vessel 20, 120 can be formed of any suitable material for use in the reaction provided it can withstand the temperature and/or pressure at which decomposition of the decomposable moiety occurs. For instance, the reactor vessel should be able to withstand temperatures up to about 250° C. where heat is the energy used to decompose the decomposable moiety. Although many materials are anticipated as being suitable, including metals, plastics, ceramics and materials such as graphite, preferably reactor vessels 20, 120 are formed of a transparent material to provide for observation of the reaction as it is proceeding. Thus, reactor vessel 20, 120 is preferably formed of quartz or a glass such as Pyrex® brand material available from Corning, Inc. of Corning, N.Y.

In the practice of the invention, either a flow of an inert gas such as argon or nitrogen or a vacuum is drawn on reactor vessel 20, 120 and a stream of decomposable moieties is fed into reactor vessel 20, 120 via feeders 40a, 40b, 140a, 140b, 140c. The decomposable moieties can be any metal containing moiety such as an organometallic compound, a complex or a coordination compound, which can be decomposed by energy at the desired decomposition conditions of pressure and temperature. For instance, if heat is the source of energy, the decomposable moiety should be subject to decomposition and production of nano-scale metal particles at temperatures no greater than 300° C., more preferably no greater than 200° C. Other materials, such as oxygen, can also be fed into reactor 20, 120 to partially oxidize the nano-scale metal particles produced by decomposition of the decomposable moiety, to modify the surface of the nano-scale particles. Contrariwise, a reducing material such as hydrogen can be fed into reactor 20, 120 to reduce the potential for oxidation of the decomposable moiety.

The energy for decomposition of the decomposable moiety is then provided to the decomposable moiety within reactor vessel 20, 120 by, for instance, heat lamp 50, 150. If desired, reactor vessel 120 can also be cooled by cooling coils 52, 152 to avoid deposit of nano-scale metal particles on the surface of reactor vessel 20, 120 as opposed to support 30, 130. Nano-scale metal particles produced by the decomposition of the decomposable moieties are then deposited on support 30, 130 or, in a cyclonic or centrifugal or other type collector, for storage and/or use.

Figure 6:
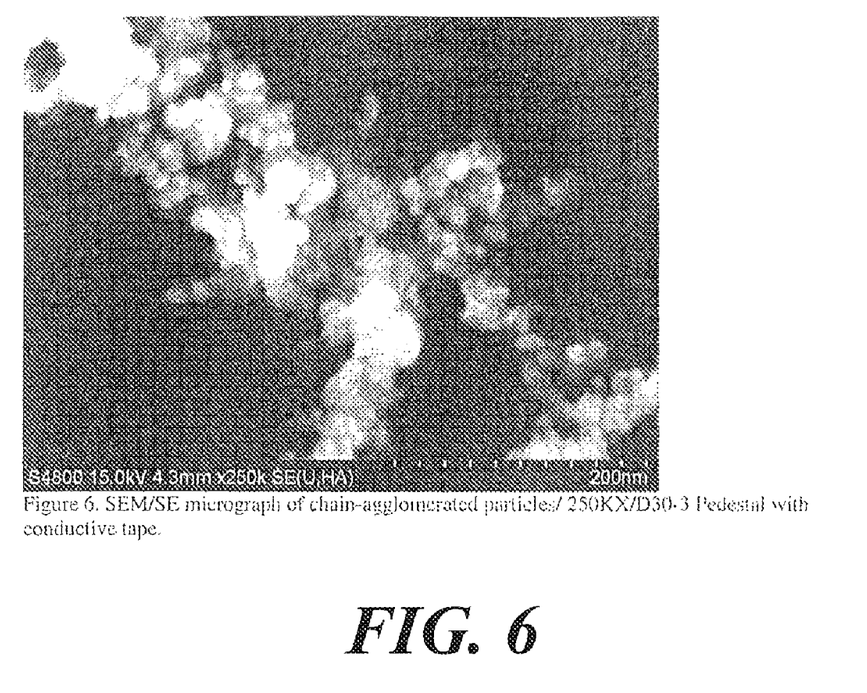
FIG. 6 is a photomicrograph of a chain agglomeration of nano-scale metal particles in accordance with the present invention.

As discussed, it is often desirable to produce chain agglomerations of nano-scale metal particles, when the end use application is catalysis or the like. A representative chain agglomeration is shown in the photomicrograph of FIG. 6; the chain agglomeration of FIG. 6 is an agglomeration of nano-scale nickel and iron particles, at a ratio of nickel to iron of about 6.5:1, shown 250,000 times its actual size. As is apparent, the chain agglomeration of FIG. 6 has an aspect ratio of at least about 1000:1.

To produce a chain agglomeration such as the one shown in FIG. 6, a vacuum of about is drawn on reactor vessel 20, 120 and a stream of decomposable moieties, such as nickel and iron carbonyls, at a partial pressure of less than 500 mm, is fed into reactor vessel 20, 120 via feeders 40a, 40b, 140a, 140b, 140c. An inert gas such as nitrogen can also be fed into reactor 20, 120, at a partial pressure of less than about 700 mm. Moiety pressures of less than about 80 mm are all that is required. The process time for production of chain agglomerations such that shown in FIG. 6 is less than about 3 seconds.

The energy for decomposition is heat support 30, 130, such as a resistively heated wire. Chain agglomerations of nano-scale metal particles produced by the decomposition of the decomposable moieties are then deposited on support 30, 130, and can be collected, for storage and/or use.

Thus the present invention provides a facile means for producing nano-scale metal particles which permits selective placement of the particles, direct deposit of the particles on the end use substrate, without the need for extremes of temperature and pressure required by prior art processes.

All cited patents, patent applications and publications referred to herein are incorporated by reference.

The invention thus being described, it will be apparent that it can be varied in many ways. Such variations are not to be regarded as a departure from the spirit and scope of the present invention and all such modifications as would be apparent to one skilled in the art are intended to be included within the scope of the following claims.

What is claimed is:

1. A process for producing chain agglomerations of nano-scale transition metal particles, comprising:
   a) providing a reactor vessel having a resistance heater positioned therein;
   b) feeding into the reactor vessel at least one decomposable moiety comprising a transition metal selected from the group consisting of iron, nickel, noble metals, and mixtures and combinations thereof, the decomposable moiety selected from the group consisting of organometallic compounds, metal complexes, metal coordination compounds and mixtures thereof into a reactor vessel having a resistance heater positioned therein;
   c) heating the resistance heater to a temperature sufficient to decompose the moiety, but no greater than 500° C.; and
   d) exposing the decomposable moiety to the resistance heater, which is at a temperature sufficient to decompose the moiety, but no greater than 500° C., such that the resistance heater provides a point of contact for the decomposition of the decomposable moiety to form nano-scale transition metal particles on said resistance heater after which decomposition occurs on the previously formed particles to produce at least one chain agglomeration of nano-scale metal particles, wherein the nano-scale metal particles have an average diameter of no greater than 250 nm and an aspect ratio of 1.4 or less, and the chain agglomerations have an aspect ratio of at least 700:1.

2. The process of claim 1, wherein the temperature within the reactor vessel is no greater than 250° C.

3. The process of claim 1, wherein oxygen is fed into the reactor vessel to partially oxidize the nano-scale metal particles produced by decomposition of the decomposable moiety.

4. The process of claim 1, wherein a reducing material is fed into the reactor vessel to reduce the potential for oxidation of the decomposable moiety.

5. The process of claim 1, wherein the pressure of the moiety is no greater than 80 mm.

6. The process of claim 5, which further comprises feeding an inert gas into the reactor at a partial pressure of less than 700 mm.

7. The process of claim 1, wherein the at least one decomposable moiety comprises a metal carbonyl.

8. The process of claim 1 wherein the reactor vessel is maintained at a pressure of no less than 1 mm.

* * * * *